United States Patent [19]

Litz

[11] 4,266,703
[45] May 12, 1981

[54] SLIDE MOUNT FOR MOTORCYCLE LUGGAGE BOX

[76] Inventor: Reuben Litz, 543-19th Ave. North, South St. Paul, Minn. 55075

[21] Appl. No.: 115,744

[22] Filed: Jan. 28, 1980

[51] Int. Cl.³ .............................................. B62J 7/04
[52] U.S. Cl. .............................. 224/32 A; 224/42.44; 248/346; 248/553; 280/289 L
[58] Field of Search ...................... 224/30 R, 31, 32 R, 224/32 A, 36, 39, 315, 319, 42.32, 42.33, 42.43, 42.44; 248/223.4, 224.1, 224.2, 346, 553; 108/55.1, 55.3; 280/202, 289 A, 289 L; 220/18, 69

[56] References Cited

U.S. PATENT DOCUMENTS

| | | | |
|---|---|---|---|
| 1,020,486 | 3/1912 | Embree | 280/202 |
| 2,229,756 | 1/1941 | McCann et al. | 224/32 R |
| 2,476,134 | 7/1949 | Care | 248/223.4 X |
| 3,366,295 | 1/1968 | Nygaard | 224/319 |
| 3,795,354 | 3/1974 | Stippich | 224/32 A |
| 3,945,544 | 3/1976 | Walker et al. | 224/32 R |
| 4,174,795 | 11/1979 | Jackson et al. | 224/32 A |
| 4,195,757 | 4/1980 | Jefferson | 224/32 A |

FOREIGN PATENT DOCUMENTS

| | | | |
|---|---|---|---|
| 724639 | 7/1942 | Fed. Rep. of Germany | 224/32 A |
| 168908 | 7/1934 | Switzerland | 224/32 A |
| 23458 | of 1906 | United Kingdom | 280/202 |
| 25447 | of 1911 | United Kingdom | 224/39 R |
| 21705 | of 1912 | United Kingdom | 224/39 R |
| 22688 | of 1912 | United Kingdom | 224/39 R |
| 187054 | 10/1922 | United Kingdom | 224/30 R |
| 333611 | 8/1930 | United Kingdom | 224/30 R |

*Primary Examiner*—Stephen Marcus
*Attorney, Agent, or Firm*—Jacobson and Johnson

[57] ABSTRACT

A luggage box is located rearward of the driver's seat on a motorcycle and can be slidably adjusted to be located near or away from the driver's seat and releasably locked in place.

4 Claims, 3 Drawing Figures

SLIDE MOUNT FOR MOTORCYCLE LUGGAGE BOX

FIELD OF THE INVENTION

This invention is directed toward providing means for securely mounting luggage rearward of the driver of a touring motorcycle in a manner such that the luggage can be easily positioned near or away from the driver's seat or easily removed when not in use.

SUMMARY OF THE INVENTION

A first rigid plate is attached to the upper frame of the motorcycle just rearward of the driver's seat. The plate contains fore and aft running grooves on its upper side. A luggage box has a second rigid plate attached to its underside which contains tongued rails formed to slidingly mate with or engage the grooves in the first plate. Releasable locking means are provided so that when the luggage box is positioned where desired it can be locked in place yet quickly and easily unlocked and repositioned or removed. In the preferred embodiment the locking means comprises a set of longitudinally spaced openings in one of the rigid plates and a key-operated plunger in the other plate. For locking, the plunger sets in one of the apertures when the box is suitably positioned. The key is operated to release the plunger when the box is to be unlocked for readjustment or removal.

The luggage mount constructed according to the teachings of this invention provides a convenient and easily operable means for converting a single seat touring motorcycle into a double seated cycle. In the former case, the luggage box is slid to a forward position and provides a backrest for the motorcycle driver. In the latter case, the luggage box is positioned rearward to provide a space behind the motorcycle driver in which is inserted another seat for a passenger and then the luggage box provides a backrest for the passenger. Also, the adjustability feature can be used for stability of the motorcycle since the box can be positioned to its most stable location on the motorcycle which most likely would be over the back wheel.

DESCRIPTION OF THE PREFERRED EMBODIMENT

Figure 2:
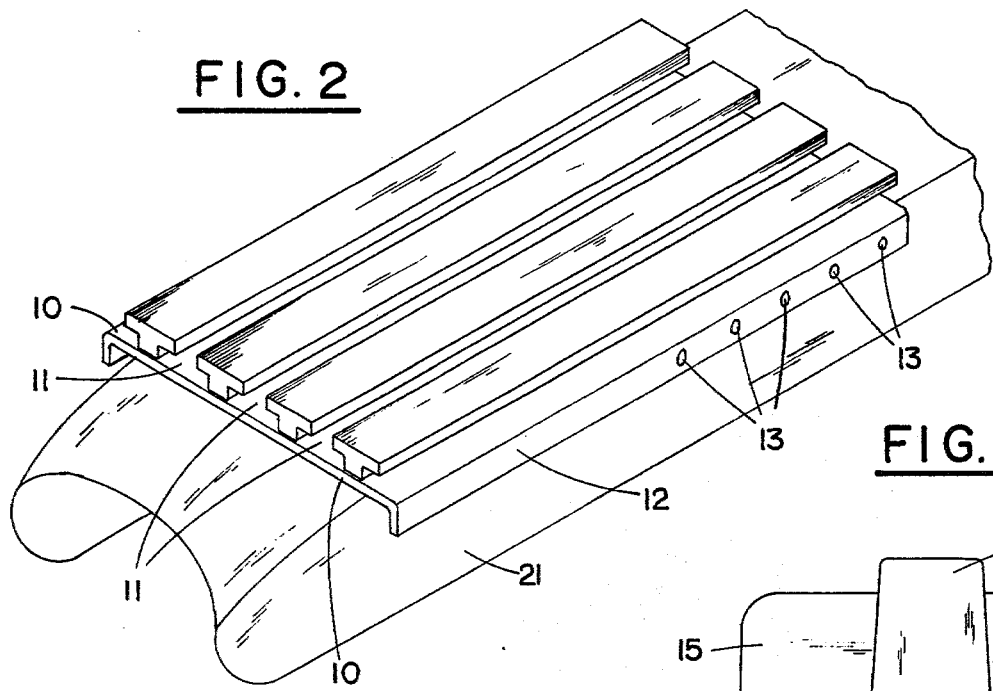
FIG. 2 is an isometric view of the lower plate to show clearly the slide grooves and the locking apertures.
Figure 3:
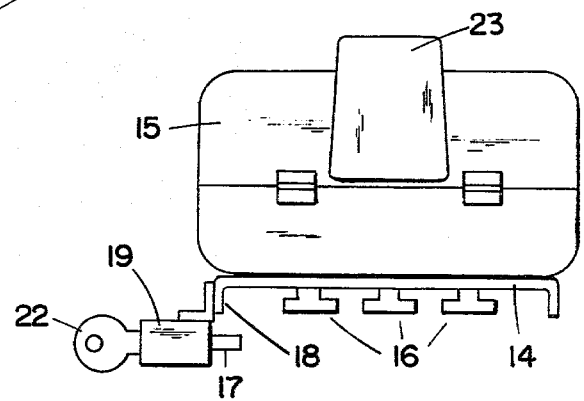
FIG. 3 is a front elevational view of the luggage box showing the tongued rails and the plunger for mating with the grooves and apertures respectively as shown in FIG. 2.
Figure 1:
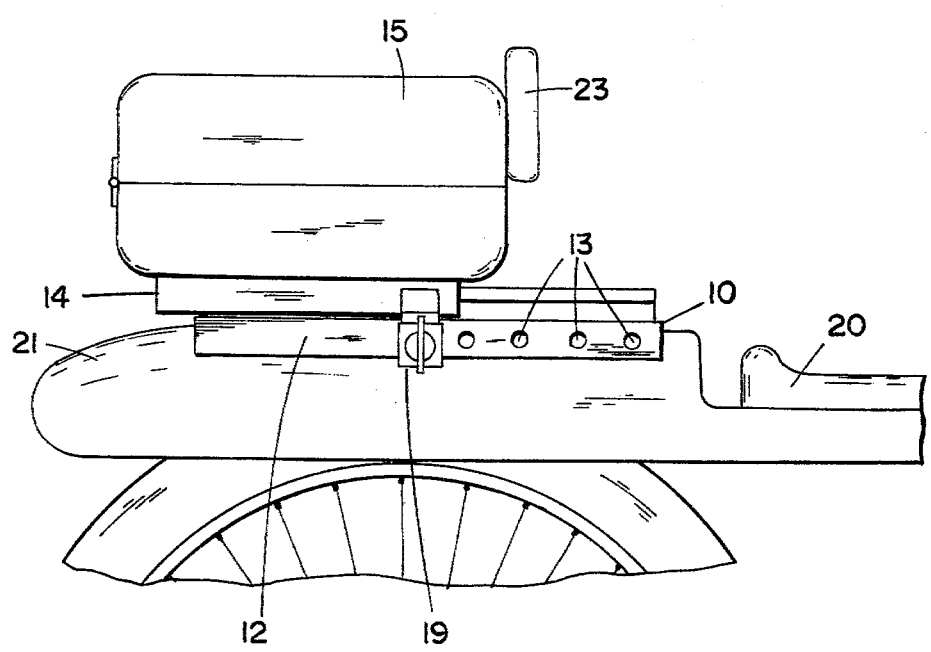
FIG. 1 is a partial side elevational view illustrating how the preferred embodiment of the invention appears when mounted on a motorcycle.

A solid plate 10 preferably made out of metal such as steel is mounted rigidly in some convenient fashion to the frame of a motorcycle. Although the manner of mounting the plate 10 is arbitrary and purely a matter of choice, in the drawing, with particular reference to FIG. 2, the plate 10 is shown mounted at the top of a sled-like shell member 21 in some suitable fashion such as by bolting, not shown. The shell 21 can then be rigidly attached to the frame of the motorcycle also in any convenient fashion, such as by bolting, not shown. The plate 10 contains slots or grooves 11 which extend fore and aft in the same general direction of travel of the motorcycle. As best observed in FIG. 1, the plate 10 is located over the rear wheel of the motorcycle with its front end just behind the seat 20 provided for the motorcycle driver. In the illustrated embodiment the plate 10 has a downward extending side wall 12 which contains a number of longitudinally spaced apertures 13.

Rigidly attached to the underside of a luggage box 15 in some convenient fashion, such as by bolting, not shown, is a second rigid metal plate 14. On the underside of plate 14 there are a set of elongated tongued rails 16 which are formed to slidably engage the grooves 11 in plate 10. Extending slightly downward from the plate 14 and rigidly attached to a side wall 18 thereof is a locking device 19 which comprises an inwardly extending plunger 17 which, preferably, is operated by a key 22. Attached to the outer front wall of the luggage box 15 is a pad 23 which constitutes a rest for the head and/or shoulders of either the motorcycle driver or a passenger.

In use, the luggage box 15 is lifted and held so that the tongued rails 16 slip into the rear ends of the grooves 11 and the box is then slid forward. When there is no passenger seat, preferably the box is moved with the plunger 17 withdrawn until the front wall of the box is far enough forward so that the pad 23 is located to serve as a suitable back or head rest for the motorcycle driver sitting in seat 20. The plunger 17 is then released by operation of key 22 so that it will engage one of the apertures 13, probably the front-most aperture. When it is desired to removed the luggage box or slide it rearward, the key 22 is operated to remove the plunger 17 from the aperture and the box is then slid rearward. To provide space for a passenger seat just behind the driver's seat 20, the box 15 can be slid rearward and then a second seat, not shown, can be placed behind the driver's seat 20 and the pad 23 will then provide a back or head rest for the passenger. The box 15 is then secured in place by the plunger 17 engaging one of the apertures 13, probably the most rearward located aperture. While not shown, to provide additional stability, apertures with a mating plunger can also be provided on the other side of the mount.

I claim:

1. An adjustable mount for carrying a luggage box on a motorcycle, comprising:
  a. a first rigid plate (10) fixedly mounted to the top of a motorcycle frame rearward of the driver's seat (20) having an elongated groove (11) extending rearward from just behind the driver's seat;
  b. a second rigid plate (14) fixedly attached to the underside of a luggage box (15) having an elongated tongued rail (16) for slidingly engaging said groove in the first plate;
  c. means (19, 13) for releasably locking said first and second plates together when the rail is engaged in the groove;
  d. whereby a luggage box can be selectively positioned rearward near or away from the driver's seat.

2. The invention as set forth in claim 1 wherein said releasable locking means comprises: aperture means (13) in one of said plates and plunger means (17) attached to the other of said plates for selectively engaging said aperture means.

3. The invention as set forth in claim 2 wherein said aperture means comprises a plurality of longitudinally spaced apertures located in a downward extending side wall (12) on the first plate.

4. The invention as set forth in claim 2 wherein said plunger is key-operated.

* * * * *